(12) United States Patent
Yoshida et al.

(10) Patent No.: US 8,976,810 B2
(45) Date of Patent: Mar. 10, 2015

(54) WIRELESS COMMUNICATION SYSTEM AND METHOD, AND WIRELESS ACCESS POINT DEVICE

(71) Applicant: Yokogawa Electric Corporation, Musashino-shi, Tokyo (JP)

(72) Inventors: Yoshio Yoshida, Musashino (JP); Noriaki Kihara, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 43 days.

(21) Appl. No.: 13/779,281

(22) Filed: Feb. 27, 2013

(65) Prior Publication Data
US 2013/0223315 A1    Aug. 29, 2013

(30) Foreign Application Priority Data

Feb. 28, 2012  (JP) ................................. 2012-041263
Nov. 21, 2012  (JP) ................................. 2012-255203

(51) Int. Cl.
*H04W 52/02* (2009.01)
*H04B 3/54* (2006.01)

(52) U.S. Cl.
CPC ............. *H04W 52/0206* (2013.01); *H04B 3/54* (2013.01); *H04B 3/542* (2013.01); *H04B 2203/5408* (2013.01); *H04B 2203/5441* (2013.01); *H04B 2203/5445* (2013.01)
USPC ........................................................ 370/466

(58) Field of Classification Search
USPC ................................................ 370/464–467
See application file for complete search history.

(56) References Cited

U.S. PATENT DOCUMENTS

| | | | |
|---|---|---|---|
| 2002/0118669 A1* | 8/2002 | Kauhanen | 370/350 |
| 2004/0047427 A1* | 3/2004 | Dostert et al. | 375/260 |
| 2004/0136393 A1* | 7/2004 | Riveiro Insua et al. | 370/432 |
| 2005/0111560 A1* | 5/2005 | Haines | 375/257 |
| 2007/0201540 A1 | 8/2007 | Berkman | |

(Continued)

FOREIGN PATENT DOCUMENTS

| | | |
|---|---|---|
| EP | 2 296 322 A1 | 3/2011 |
| JP | 54-110862 A | 8/1979 |

(Continued)

OTHER PUBLICATIONS

European Search Report dated Jul. 4, 2013, issued in European Patent Application No. 13157029.3.

(Continued)

*Primary Examiner* — Kerri Rose
(74) *Attorney, Agent, or Firm* — Sughrue Mion, PLLC (57) ABSTRACT

A wireless communication system in which wireless communication can be performed via a wireless communication network, the wireless communication system comprising: a wireless access point device configured to operate by using power supplied via a two-wire cable, to perform wireless communication with wireless field devices via the wireless communication network, and to perform communication via the two-wire cable; and a conversion device connected to the two-wire cable and to a control unit configured to control the wireless field devices, the conversion device being configured to supply power to the wireless access point device via the two-wire cable, and to perform conversions between signals, which are input and output from the control unit, and signals, which are transmitted and received via the two-wire cable.

10 Claims, 7 Drawing Sheets

(56) References Cited

U.S. PATENT DOCUMENTS

| | | | |
|---|---|---|---|
| 2008/0107134 A1* | 5/2008 | Okazaki et al. | 370/479 |
| 2009/0174532 A1* | 7/2009 | Galli et al. | 340/310.11 |
| 2009/0310577 A1 | 12/2009 | Kiribayashi | |
| 2011/0075685 A1* | 3/2011 | Xu et al. | 370/503 |
| 2011/0122769 A1* | 5/2011 | Zhang | 370/235 |
| 2013/0163681 A1* | 6/2013 | Wolter et al. | 375/257 |

FOREIGN PATENT DOCUMENTS

| | | |
|---|---|---|
| JP | 2004-007187 A | 1/2004 |
| JP | 2005-244830 A | 9/2005 |
| JP | 2006-148593 A | 6/2006 |
| JP | 2006-270248 A | 10/2006 |
| JP | 2009-290626 A | 12/2009 |
| JP | 2010-528513 A | 8/2010 |
| JP | 2011-9890 A | 1/2011 |
| JP | 2011-254209 A | 12/2011 |
| WO | 01/24427 A1 | 4/2001 |
| WO | 2008/007514 A1 | 1/2008 |
| WO | 2008/142449 A1 | 11/2008 |

OTHER PUBLICATIONS

Shuji Yamamoto, et al., "Field Wireless Solution Based on ISA100.11a to Innovate Instrumentation", Yokogawa Technical Report English Edition, 2010, pp. 7-12, vol. 53, No. 2.

* cited by examiner

WIRELESS COMMUNICATION SYSTEM AND METHOD, AND WIRELESS ACCESS POINT DEVICE

BACKGROUND OF THE INVENTION

1. Field of the Invention

The present invention relates to a wireless communication system, a wireless communication method, and a wireless access point device.

Priority is claimed on Japanese Patent Applications No. 2012-041263, filed Feb. 28, 2012, and No. 2012-255203, filed Nov. 21, 2012 the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, distributed control systems (DCS) are constructed in industrial plants and factories and the like. In these DCS, on-site instruments (such as measuring instruments and operating machinery) known as field devices that are used to perform high-level automated operations, and a control unit that controls these instruments are connected together via a communication device. Most of the communication systems that form the basis of this type of distributed control system have been communication systems that communicate by wires, however, in recent years, systems that perform wireless communication based on industrial wireless communication standards such as ISA 100.11a and Wireless HART (Registered Trademark) have been developed.

Communication systems that are based on the aforementioned industrial wireless communication standards are formed, broadly speaking, by field devices that are able to communicate wirelessly (i.e., wireless field devices), a wireless access point device, and a control device. A wireless access point device is a device that is connected to a control unit via a communication line, and is installed in a location that allows it to communicate wirelessly with wireless field devices, and that relays various types of data that are exchanged between the wireless field devices and the control unit. A control unit is a device that controls the wireless field devices by transmitting and receiving various types of data (for example, measurement data and control data) with the wireless field devices via the wireless access point device.

In a communication system that is based on the aforementioned ISA 100.11a, the data transfer speed between the wireless field devices and the wireless access point device is set at, for example, 250 kbps (bit per second). Because the wireless access point device normally performs wireless communication with a plurality of wireless field devices, the data transfer speed between the wireless access point device and the control unit must be set to a faster speed than the data transfer speed (250 kbps) between the wireless field devices and the wireless access point device. Because of this, the wireless access point device and the control unit are connected together via a high-speed communication line such as, for example, an Ethernet (Registered Trademark) cable.

An example of a wireless communication system in which wireless communication that is based on the aforementioned ISA 100.11a is possible is disclosed in "Field Wireless Solution Based on ISA 100.11a to Innovate Instrumentation" in the Yokogawa Technical Report Vol. 53, no. 2, 2010 by Shuji Yamamoto, et al. A system in which the transmitting and receiving of data, as well as the supplying of power are achieved via an Ethernet (Registered Trademark) cable is disclosed in Japanese Unexamined Patent Application, First Publication No. 2005-244830. An example of a power line communications (PLC) system in which the transmitting and receiving of data is possible via a power line is disclosed in Japanese Unexamined Patent Application, First Publication No. 2006-148593.

Generally, while it is common for wireless field devices to be installed in hazardous locations such as areas where inflammable gas is used, the control unit is normally installed away from the hazardous location in a non-hazardous location (i.e., in a safe area where inflammable gas or the like is not being used). Because it is necessary for the above-described wireless access point device to maintain wireless transmission quality between itself and the wireless field devices, the wireless access point device cannot be installed in a location further than several hundred meters from the wireless field devices, and often the wireless access point device ends up being installed in a location having the same hazard level as the wireless field device.

Here, the maximum length of an Ethernet (Registered Trademark) cable is prescribed by a Standard. For example, in the 10 Base-T and 100 Base-T Standards, the maximum length of the cable is prescribed as 100 meters. Because of this, if the distance between a hazardous location and a control unit that is installed in a non-hazardous location is approximately several hundred meters, then it is quite possible that the wireless access point device that is connected to the Ethernet (Registered Trademark) cable will be located in the hazardous location. However, if the distance between the hazardous location and the control unit that is installed in a non-hazardous location is approximately several kilometers, then it is not possible for the wireless access point device that is connected to the Ethernet (Registered Trademark) cable to be installed in the hazardous location, and the distance between the wireless field devices and the wireless access point device ends up extending to several kilometers, and the problem arises that it becomes impossible for communication to be performed between the wireless field devices and the control unit.

Here, although it does become possible to extend the wire length between the wireless access point device and the control unit if a repeater is installed, the problem arises that this need to install a repeater causes the costs the costs to increase by a corresponding amount. This is also the case when the Ethernet (Registered Trademark) cable disclosed in Japanese Unexamined Patent Application, First Publication No. 2005-244830 which is capable of both transmitting and receiving data as well as supplying power is used.

Moreover, in an Ethernet (Registered Trademark) that employs an optical fiber, it is possible to extend the wire length between the wireless access point device and the control unit to a range of several kilometers without having to use a repeater. However, in an Ethernet (Registered Trademark) that employs an optical fiber, it is necessary to provide an optical converter to convert electrical signals into optical signals, and wiring to supply power to the optical converter. As a consequence, the problems arise that not only does the power consumption increase, but the costs also increase.

SUMMARY

A wireless communication system in which wireless communication can be performed via a wireless communication network, the wireless communication system may include: a wireless access point device configured to operate by using power supplied via a two-wire cable, to perform wireless communication with wireless field devices via the wireless communication network, and to perform communication via the two-wire cable; and a conversion device connected to the two-wire cable and to a control unit configured to control the wireless field devices, the conversion device being configured to supply power to the wireless access point device via the two-wire cable, and to perform conversions between signals, which are input and output from the control unit, and signals, which are transmitted and received via the two-wire cable.

The conversion device may be configured to transmit to the wireless access point device via the two-wire cable first time data that shows the time when a synchronization signal to the wireless access point device was delivered to the two-wire cable, and second time data that shows when the synchronization signal from the wireless access point device that was transmitted via the two-wire cable was received. The wireless access point device may be configured to correct times managed by itself by using the time when the synchronization signal from the conversion device that was transmitted via the two-wire cable was received, the time when the synchronization signal to the conversion device was delivered to the two-wire cable, and the times shown by the first time data and second time data.

The conversion device may include a barrier device configured to output a signal that satisfies an intrinsically safe explosion-proof standard to the two-wire cable.

A data transfer speed of communication performed via the two-wire cable may be set to a higher speed than a data transfer speed of wireless communication that is performed via the wireless communication network.

A wireless communication method in which wireless communication is performed via a wireless communication network, may include: a first step in which power is supplied to a two-wire cable so as to enable a wireless access point device to operate, the wireless access point device performing wireless communication with wireless field devices via the wireless communication network, and also performing communication via the two-wire cable; and a second step in which conversions are performed between signals, which are input and output from a control unit for controlling the wireless field devices, and signals, which are transmitted and received via the two-wire cable.

The wireless communication method may further include: a third step in which synchronization signals are transferred and received via the two-wire cable and, based on the times when the synchronization signals were delivered to the two-wire cable, and on the times when the synchronization signals were received via the two-wire cable, the times managed by the control unit are synchronized with the times managed by the wireless field devices.

A wireless access point device that performs wireless communication with wireless field devices via a wireless communication network, may include: a power supply unit configured to generate an internal power supply, which is required to operate, based on the power supplied via a two-wire cable; a wireless communication unit configured to be supplied with the internal power supply generated by the power supply unit, and to perform wireless communication via the wireless communication network; and a first wired communication unit configured to be supplied with the internal power supply generated by the power supply unit, and to perform communication via the two-wire cable.

The wireless access point device may further include: a power control unit configured to be supplied with the internal power supply generated by the power supply unit, and to perform control in order to reduce at least the power consumed by the wireless communication unit and the first wired communication unit.

The power control unit may be configured to perform control to switch the wireless communication unit to a low power consumption mode when the wireless communication unit is not performing wireless communication via the wireless communication network, and to perform control to switch the first wired communication unit to a low power consumption mode when the first wired communication unit is not performing communication via the two-wire cable.

The wireless access point device may further include: a time management unit configured to manage times. The power control unit may be configured to perform control to switch at least one of the wireless communication unit and the first wired communication unit to a low power consumption mode while referring to the times managed by the time management unit.

The wireless access point device may further include: a control unit configured to control the first wired communication unit so as to cause synchronization signals to be transmitted and received via the two-wire cable, the control unit being configured to correct the times managed by the time management unit based on the times when the synchronization signals were delivered to the two-wire cable and on the times when the synchronization signals were received via the two-wire cable.

The wireless access point device may further include: a second wired communication unit configured to perform communication via at least one cable that is different from the two-wire cable. The wireless access point device may be configured to select one of the first and second wired communication units, and to perform communication via the two-wire cable or communication via the cable that is different from the two-wire cable.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Preferred Embodiment

Figure 1:
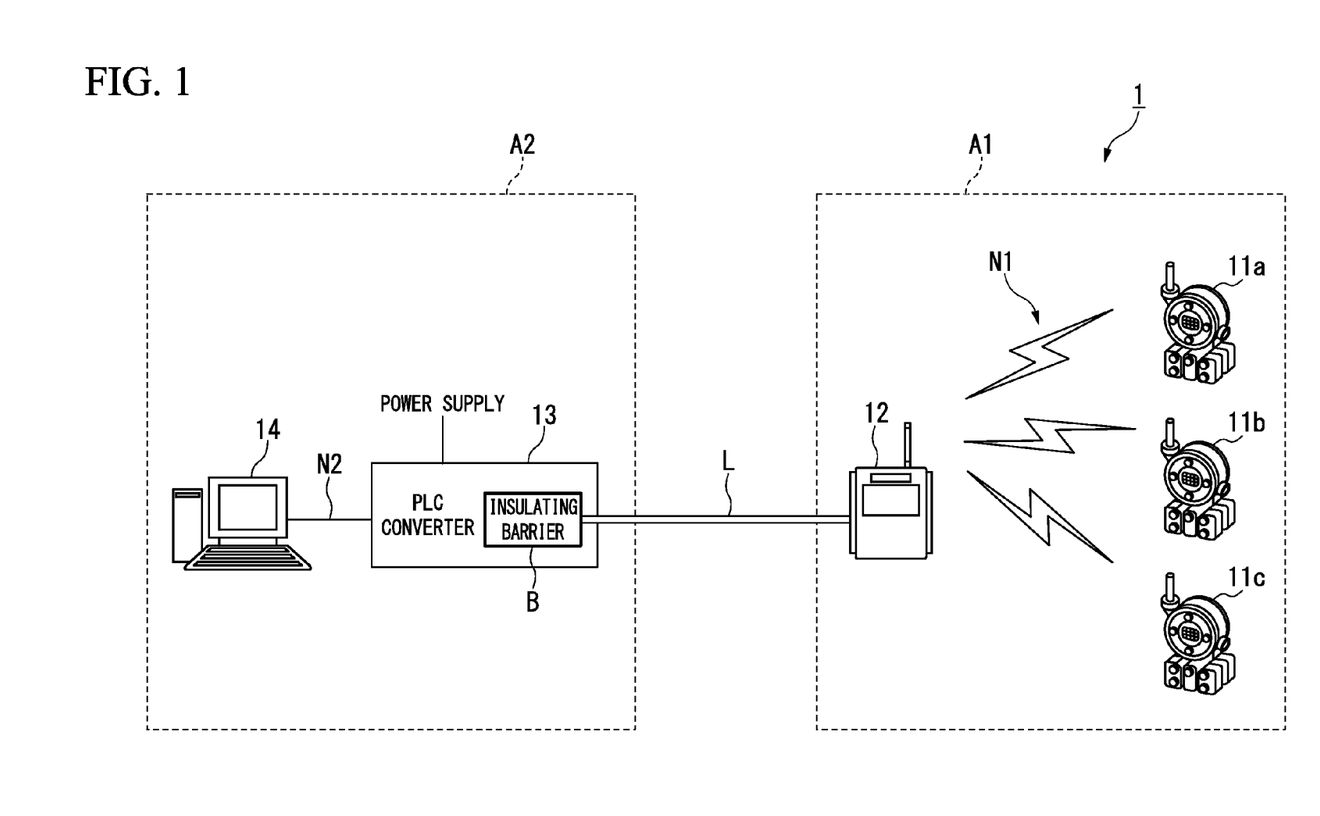
FIG. 1 is a block diagram showing the structure of principal portions of a wireless communication system in accordance with a first preferred embodiment of the present invention.

FIG. 1 is a block diagram showing the structure of principal portions of a wireless communication system in accordance with a first preferred embodiment of the present invention. As is shown in FIG. 1, a wireless communication system 1 includes wireless field devices 11a to 11c, a wireless access point device 12, a PLC (power line communications) converter 13 (i.e., a conversion device), and a control unit 14. Communication can be achieved via a wireless communication network N1, a PLC line L, and a wired communication network N2.

Note that, in FIG. 1, the rectangular area indicated by symbol A1 shows a site such as an industrial plant where the wireless field devices 11a to 11c and the wireless access point device 12 are installed, while the rectangular area indicated by the symbol A2 shows a control room where the PLC converter 13 and the control unit 14 are installed. Here, the site A1 can be taken as a hazardous location in which an inflammable gas is sometimes used, while the control room A2 can be taken as a non-hazardous location. Note also that, in FIG. 1, three wireless field devices 11a to 11c are shown, however, the number of wireless field devices is optional.

The control room A2 is provided at a location, for example, between several hundred meters and several kilometers from the site A1. Because of this, the site A1 and the control room A2 are connected together by the PLC line L. This PLC line L is a two-wire cable that is capable of both supplying power and transmitting signals, and is set to a length of between several hundred meters and several kilometers in accordance with the distance between the site A1 and the control room A2 and the necessary transmission speed. Specifically, a transmission line used, for example, for transmitting signals of between 4 and 20 mA can be used for the PLC line L.

The wireless field devices 11a to 11c may be, for example, sensing instruments such as flow meters and temperature sensors, valve instruments such as flow rate control valves and switching valves, actuator instruments such as fans and motors, or other instruments installed on the site A1, and perform wireless communication that conforms with ISA 100.11a, which is a wireless communication standard for industrial automation. Operations of the wireless field devices 11a to 11c are controlled based on control data that is transmitted to them from the control unit 14 via the wireless access point device 12. Measurement data obtained by the wireless field devices 11a to 11c is collected in the control unit 14.

The wireless access point device 12 forms the wireless communication network N1 between itself and the wireless field devices 11a to 11c, and performs wireless communication with the wireless field devices 11a to 11c that are participating in the wireless communication network N1. Note that the wireless access point device 12 also performs wireless communication based on the aforementioned wireless communication Standard ISA 100.11a. Note also that the data transfer speed between the wireless access point 12 and the wireless field devices 11a to 11c via the wireless communication network N1 may be, for example, 250 kpbs (bits per second).

This wireless access point device 12 is installed at the site A1 and is connected to the PLC line L, and operates using power that is supplied via the PLC line L. In addition to the aforementioned wireless communication that it performs with the wireless field devices 11a to 11c, the wireless access point device 12 also performs communication (i.e., wired communication) via the PLC line L. Note that the detailed structure of the wireless access point device 12 is described below.

The PLC converter 13 is connected to the PLC line L and the wired communication network N2, and supplies power to the wireless access point device 12 via the PLC line L. In addition, the PLC converter 13 performs conversions between signals that are transmitted and received via the PLC line L and signals that are transmitted and received via the wired communication network N2. Specifically, when the PLC converter 13 receives a signal from the wired communication network N2, it converts it into a signal that is suitable for communication performed via the PLC line L, and then delivers it to the PLC line L. Moreover, when the PLC converter 13 receives a signal from the PLC line L (i.e., a signal that is suitable for communication performed via the PLC line L), it converts it into a signal that is suitable for communication performed via the wired communication network N2, and then delivers it to the wired communication network N2.

Here, a signal that is suitable for communication performed via the PLC line L is, for example, a signal whose carrier wave has a frequency of 800 kHz, and that has undergone modulation processing such as pulse width modulation or orthogonal frequency division multiplexing (OFDM) modulation. Moreover, a signal that is suitable for communication performed via the wired communication network N2 is a baseband format signal when the wired communication network N2 is an Ethernet (Registered Trademark) network.

Note that the data transfer speed between the wireless access point device 12 and the PLC converter 13 via the PLC line L is set faster than the data transfer speed between the wireless access point device 12 and the wireless field devices 11a to 11c via the wireless communication network N1, for example, it may be set to approximately 1 Mbps. The data transfer speed between the PLC converter 13 and the control unit 4 via the wired communication network N2 is set, for example, to approximately 10 Mbps.

Moreover, an insulating barrier B (i.e., a barrier device), which meets intrinsically safe explosion-proof standards, is provided in a connection interface portion (i.e., a connection portion) of the PLC converter 13 to which the PLC line L is connected. This insulating barrier B is formed, for example, by a limiter circuit, and ensures that the voltage applied to the PLC line L does not exceed a previously stipulated voltage (for example, 24 [V]). Namely, the insulating barrier B outputs a signal that meets intrinsically safe explosion-proof standards to the PLC line L which is formed by a two-wire cable. By providing this type of insulating barrier B, the PLC converter 13 that is connected via the PLC line L to the wireless access point device 12 that has been installed at the site A1 is eliminated as a possible source for igniting inflammable gas.

The control unit 14 is connected to the wired communication network N2, and performs control and the like of the wireless field devices 11a to 11c while communicating with the wireless field devices 11a to 11c. Specifically, it controls the wireless field devices 11a to 11c that are participating in the wireless communication network N1, and collects measurement data obtained by these wireless field devices 11a to 11c. Moreover, the control unit 14 performs processing to determine whether or not to allow any new wireless field devices to participate in the wireless communication network N1.

Figure 2:
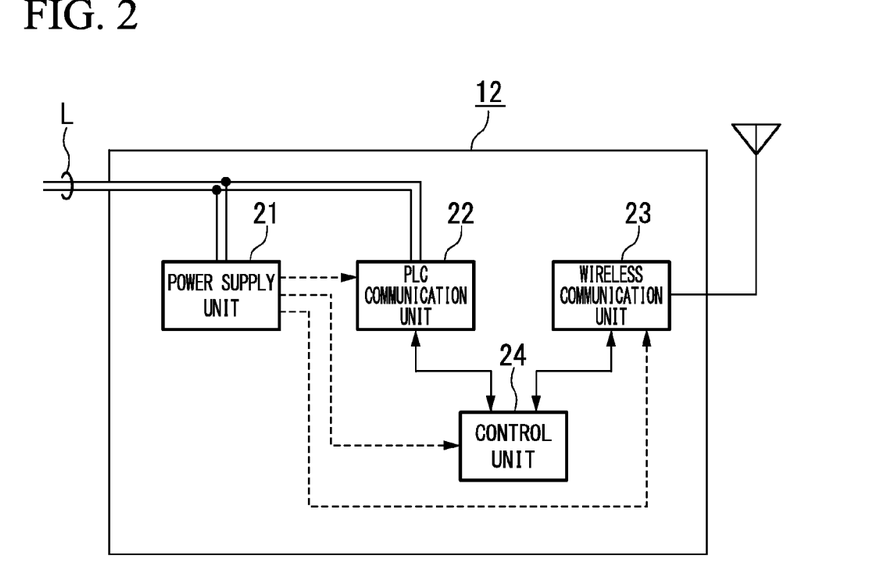
FIG. 2 is a block diagram showing the structure of principal portions of a wireless access point device in accordance with the first preferred embodiment of the present invention.

Next, the internal structure of the wireless access point device 12 will be described. FIG. 2 is a block diagram showing the structure of principal portions of a wireless access point device in accordance with the first preferred embodiment of the present invention. Note that, in FIG. 2, of the structure provided in the wireless access point device 12, only structure that is needed in order to describe the present invention is shown. As is shown in FIG. 2, the wireless access point device 12 includes a power supply unit 21, a PLC communication unit (i.e., a first wired communication unit), a wireless communication unit 23, and a control unit 24.

Based on the power that is supplied from the PLC converter 13 via the PLC line L, the power supply unit 21 generates an internal power supply that is needed in order for the wireless access point device 12 to operate. Note that, in FIG. 2, the internal power supply that is generated by the power supply unit 21 and supplied to the PLC communication unit 22, the wireless communication unit 23, and the control unit 24 is shown by a broken line. The PLC communication unit 22 operates using the internal power supply supplied from the power supply unit 21, and communicates via the PLC line L under the control of the control unit 24.

Specifically, when data has been output from the control unit 24, the PLC communication unit 22 performs the same type of modulation and the like as that performed by the above-described PLC converter 13 so as to convert this output data into a signal that is suitable for communication via the PLC line L, and then delivers this signal to the PLC line L. When a signal from the PLC line L (i.e., a signal that is suitable for communication via the PLC line L) is received, the PLC communication unit 22 demodulates the received signal and then outputs it to the control unit 24.

The wireless communication unit 23 operates using the internal power supply supplied from the power supply unit 21, and performs wireless communication with the wireless field devices 11a to 11c via the wireless communication network N1 under the control of the control unit 24. Note that the wireless communication performed in the wireless communication unit 11 conforms to the Wireless Communication Standard ISA 100.11a.

The control unit 24 operates using the internal power supply supplied from the power supply unit 21, and collectively controls the overall operations of the wireless access point device 12. Specifically, the control unit 24 controls the wireless communication unit 23 such that it performs wireless communication with the wireless field devices 11a to 11c that are participating in the wireless communication network N1, and also controls the PLC communication unit 22 such that it performs communication with the PLC converter 13 via the PLC line L. Moreover, the control unit 24 also relays data that is transmitted and received by the PLC communication unit 22 and data that is transmitted and received by the wireless communication unit 23.

Next, operations of the wireless communication system 1 having the above-described structure will be briefly explained. When the power supply of the PLC converter 13 is turned on, power is supplied from the PLC converter 13 to the wireless access point device 12 via the PLC line L. As a result of this, in the power supply unit 21 of the wireless access point device 12, the internal power supply that is needed for the wireless access point device 12 to operate is generated based on the power that is supplied via the PLC line L. This internal power supply is supplied to each of the PLC communication unit 22, the wireless communication unit 23, and the control unit 24 of the wireless access point device 12 so that, as a consequence, the wireless access point device 12 is placed in an operative state (first step).

When the wireless access point device 12 enters into an operative state, wireless communication via the wireless communication network N1 becomes possible between the wireless access point device 12 and the wireless field devices 11a to 11c. Note that when the wireless field devices 11a to 11c first participate in the wireless communication network N1, processing is performed by the control unit 14 to determine whether or not to allow the wireless field devices 11a to 11c to participate in the wireless communication network N1, however, that processing is not described here in order to simply the explanation.

Here, when a control signal for controlling the wireless field device 11a is output from the control unit 14, this control signal is transmitted via the wired communication network N2 to the PLC converter 13, and is received by the PLC converter 13. The control signal that is received by the PLC converter 13 is then modulated by either pulse width modulation processing or OFDM modulation processing or the like so as to be converted into a signal that is suitable for communication via the PLC line L. This control signal is then delivered to the PLC line L (second step).

The control signal that was transmitted via the PLC line L is received by the PLC communication unit 22 of the wireless access point device 12 and, after being demodulated, is output to the control unit 24. When the control signal is input into the control unit 24, the control unit 24 processes it into a previously prescribed format, and the processed control signal is then output to the wireless communication unit 23. Consequently, the processed control signal is transmitted from the wireless control unit 23 to the wireless field device 11a via the wireless communication network N1. As a result of this, processing or operations are performed in the wireless field device 11a based on the control signal sent from the control unit 14.

If, for example, the above-described control signal shows a collection of measurement data measured by the wireless field device 11a, then the operation of the wireless field device 11a that is performed based on the above-described control signal is an operation to transmit the measurement data to the control unit 14. When the measurement data is transmitted from the wireless field device 11a, the transmitted measurement data is received by the wireless communication unit 23 of the wireless access point device 12 via the wireless communication network N1.

After the measurement data received by the wireless communication unit 23 has been output to the control unit 24 and processed into a previously prescribed format, it is output to the PLC communication unit 22. The measurement data that is input into the PLC communication unit 22 is modulated by either pulse width modulation processing or OFDM modulation processing or the like so as to be converted into a signal that is suitable for communication via the PLC line L, and is then delivered to the PLC line L.

The measurement data was transmitted via the PLC line L is received by the PLC converter 13 and, after being demodulated, is converted into a signal that is suitable for communication via the wired communication network N2. This signal is then delivered to the wired communication network N2 (second step). The measurement data delivered to the wired communication network N2 is received by the control unit 14 so that, as a result, the measurement data from the wireless field device 11a is collected in the control unit 14.

As has been described above, in the present preferred embodiment, the wireless access point device 12 that performs wireless communication via the wireless communication network N1 with the wireless field devices 11a to 11c is installed at the site A1, and, in addition, the PLC converter 13, which is connected to the control unit 14, is installed in the control room A2, so that the wireless access point device 12 and the PLC converter 13 are connected together by the PLC line L. Moreover, power is supplied from the PLC converter 13 to the wireless access point device 12 via the PLC line L, and communication is performed between the wireless access point device 12 and the PLC converter 13 via the PLC line L.

Because of this, even if the locations where the wireless field devices 11a through 11c are installed are distant from the location where the control unit 14 is installed, communication can still be performed between the wireless field devices 11a through 11c and the control unit 14 without this leading to any large increase in costs. Here, because the data transfer speed via the PLC line L between the wireless access point device 12 and the PLC converter 13 is set to a faster speed than the data transfer speed via the wireless communication network N1 between the wireless access point device 12 and the wireless field devices 11a through 11c, even if the wireless access point device 12 is in communication with a number of wireless field devices 11a through 11c, such communication can still be performed normally.

The wireless communication system, wireless communication method, and wireless access point device in accordance with the first preferred embodiment of the present invention have been described above, however, the present invention is not limited to the above-described preferred embodiment and can be freely modified within the range of the present invention. For example, in the above-described preferred embodiment, as is shown in FIG. 2, a case in which the wireless access point device 12 can only be connected to the PLC line L is described, however, a system in which the wireless access point device 12 can also be connected to another cable (for example, an Ethernet (Registered Trademark) cable) in addition to the PLC line L is also possible.

Figure 3:
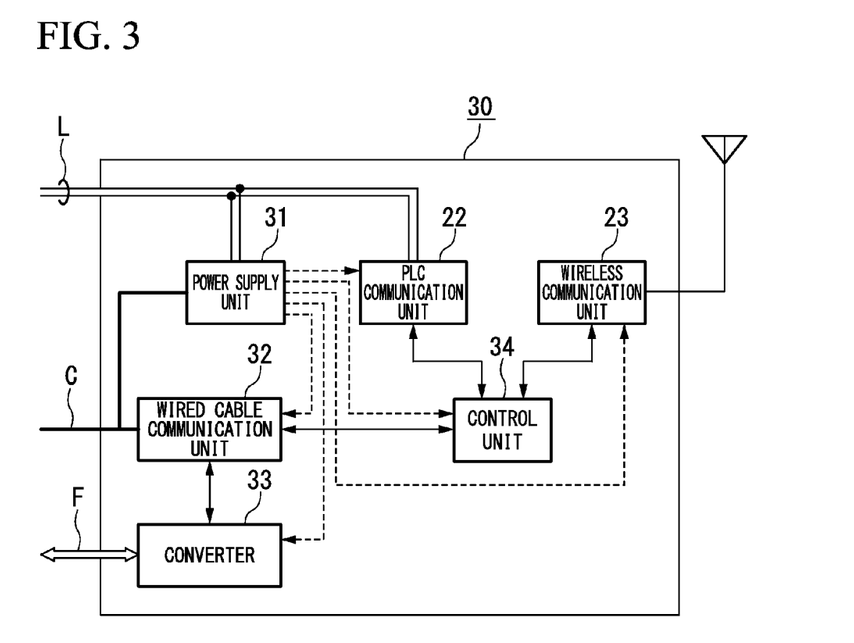
FIG. 3 is a block diagram showing a first variant example of the wireless access point device in accordance with the first preferred embodiment of the present invention.

FIG. 3 is a block diagram showing a first variant example of the wireless access point device in accordance with the first preferred embodiment of the present invention. Note that, in FIG. 3, blocks that are the same as the blocks shown in FIG. 2 are given the same descriptive symbols. A wireless access point device 30 shown in FIG. 3 includes a power supply unit 31 and a control unit 34 in place of the power supply unit 21 and the control unit 24 provided in the wireless access point device 12 shown in FIG. 2, and additionally includes a wired cable communication unit 32 (i.e., a second wired communication unit) and a converter 33.

In the same way as the power supply unit 21 shown in FIG. 2, the power supply unit 31 generates the internal power supply that is needed for the wireless access point device 30 to operate based on the power that is supplied via the PLC line L. However, in addition to the power that is supplied via the PLC line L, the power supply unit 31 is also able to generate the above-described internal power supply on the basis of the power that is supplied via the cable C that is used by the Ethernet (Registered Trademark).

The wired cable communication unit 32 operates using the internal power supply supplied from the power supply unit 31, and performs communication via the cable C under the control of the control unit 34. The converter 33 operates using the internal power supply supplied from the power supply unit 31, and converts optical signals transmitted via an optical fiber F that is used by the Ethernet (Registered Trademark) into electrical signals, which it then outputs to the wired cable communication unit 32. The converter 33 also converts signals (i.e., electrical signals) output from the wired cable communication unit 32 into optical signals, which it then delivers to the optical fiber F.

In the same way as the control unit 24 shown in FIG. 2, the control unit 34 operates using the internal power supply supplied from the power supply unit 31, and collectively controls the overall operations of the wireless access point device 30. However, in accordance with the situation regarding the establishment of communication paths in the PLC communication unit 22 and the wired cable communication unit 32, the control unit 34 selects one of the PLC communication unit 22 and the wired cable communication unit 32 (i.e., the converter 33), and then performs communication. Note that, if a communication path has been established in both the PLC communication unit 22 and the wired cable communication unit 32, the control unit 34 makes the aforementioned selection in accordance with a previously prescribed order of priority.

The wireless access point device 30 having the above-described structure includes connection interfaces for each of the PLC line L, the cable C, and the optical fiber F, and, in addition to communication via the PLC line L, it is also able to perform communication via the cable C, or communication via the optical fiber F. Because of this, this wireless access point device 30 can be flexibly adapted to the environment of the industrial plant or factory (i.e., with the type of communication line that has been laid) where it is installed. Moreover, compared with systems in which only a dedicated connection interface (i.e., only one of the interfaces for the PLC line L, the cable C, and the optical fiber F) is provided, it is possible to achieve a reduction in costs, and to perform control more easily.

As has been described above, in addition to the power that is supplied via the PLC line L, the wireless access point device 30 is also able to generate an internal power supply based on the power that is supplied via the cable C. Here, if the cable C that is connected to the wireless access point device 30 is not one that is capable of supplying power, then the PLC line L can be used as the power supply line, and the cable C can be used as the communication line.

Figure 4:
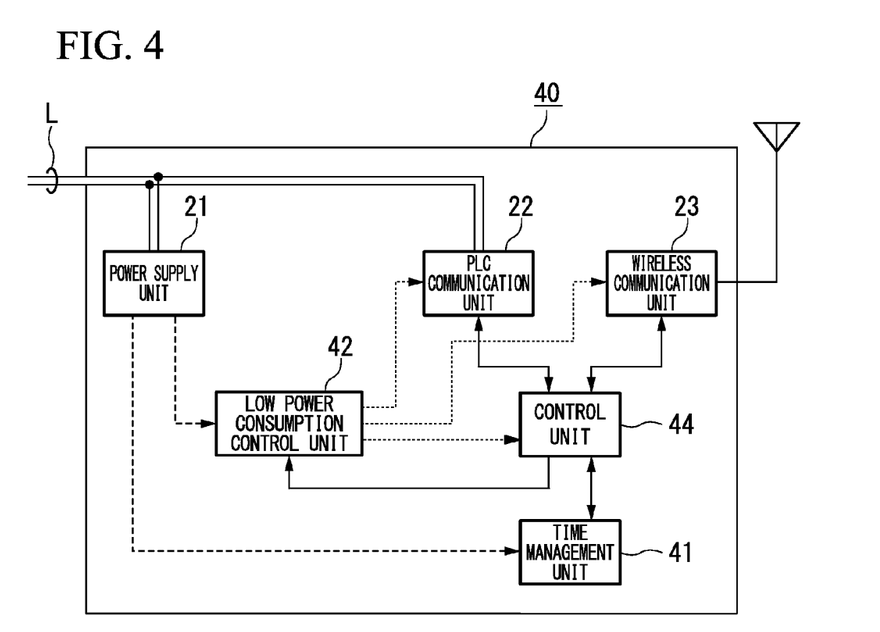
FIG. 4 is a block diagram showing a second variant example of the wireless access point device in accordance with the first preferred embodiment of the present invention.

FIG. 4 is a block diagram showing a second variant example of the wireless access point device in accordance with the first preferred embodiment of the present invention. Note that, in FIG. 4, blocks that are the same as the blocks shown in FIG. 2 are given the same descriptive symbols. A wireless access point device 40 shown in FIG. 4 includes a control unit 44 in place of the control unit 24 provided in the wireless access point device 12 shown in FIG. 2, and additionally includes time management unit 41 and a low power consumption control unit 42 (i.e., a power control unit). Note that, in FIG. 4, in order to avoid making the drawing too complex, the internal power supplies supplied from the power supply unit 21 to the PLC communication unit 22, the wireless communication unit 23, and the control unit 44 have been omitted, and only the internal power supplies that are supplied from the power supply unit 21 to the time management unit 41 and the low power consumption control unit 42 are shown (by the broken lines).

By reducing the power consumption, this wireless access point device 40 makes it possible for communication to be performed via the PLC line L over an even greater distance. Namely, if the power consumption of the wireless access point device is too great, it becomes necessary to supply a greater quantity of current to the PLC line L. Because of this, the voltage drop that is caused by the resistance component of the PLC line L increases, and this places a limitation on the maximum length of the PLC line L. If the voltage applied to the PLC line L is raised in order to overcome this limitation, then although this does make it possible to reduce the current supplied to the PLC line L, because the voltage that can be applied to the PLC line L is limited by the intrinsically safe explosion-proof standard, the limitation on the length of the PLC line L effectively cannot be greatly eased (i.e., the maximum length is not greatly increased). By reducing the power consumption, the wireless access point device 40 makes it possible to alleviate the limitation on the length of the PLC line L (i.e., increases the maximum possible length thereof).

The time management unit 41 operates using the internal power supply supplied from the power supply unit 21, and manages times under the control of the control unit 44. The low power consumption control unit 42 operates using the internal power supply supplied from the power supply unit 21, and performs control so as to reduce the amount of power consumed by the PLC communication unit 22, the wireless communication unit 23, and the control unit 44. Note that, in FIG. 4, the control signals output from the low power consumption control unit 42 to the PLC communication unit 22, the wireless communication unit 23, and the control unit 44 are shown by dotted lines.

Specifically, when the PLC communication unit 22 is not performing communication via the PLC line L, the low power consumption control unit 42 switches the PLC communication unit 22 to a low power consumption mode (i.e., to a low power consumption state), and when the wireless communication unit 23 is not performing wireless communication via the wireless communication network N1, the low power consumption control unit 42 performs control so as to switch the wireless communication unit 23 to a low power consumption mode. Note that the low power consumption mode includes, for example, the switching of either all of or a portion of the circuits within each unit to a standby state or a sleep state or the like. Moreover, when the control unit 44 is not performing previously prescribed control or processing, the time management unit 41 performs control so as to switch the control unit 44 to a low power consumption mode.

Here, schedule information that includes the prescribed times for the PLC communication unit 22 to perform communication via the PLC line L, and the prescribed times for the wireless communication unit 23 to perform wireless communication via the wireless communication network N1 is stored in the low power consumption control unit 42. The low power consumption control unit 42 refers to the times managed by the time management unit 41 (i.e., to the time information input via the control unit 44), and performs the above-described controls based on the aforementioned schedule information.

More specifically, when the PLC communication unit 22 or the wireless communication unit 23 are performing transmission processing, the low power consumption control unit 42 cancels the low power consumption mode setting of the PLC communication unit 22 or the wireless communication unit 23. When the transmission processing of the PLC communication unit 22 or the wireless communication unit 23 ends, the low power consumption control unit 42 once again switches the PLC communication unit 22 or the wireless communication unit 23 to a low power consumption mode. On the other hand, when the PLC communication unit 22 or the wireless communication unit 23 are performing reception processing, the low power consumption control unit 42 switches only a portion of the reception circuits to an operative state, and leaves the remaining circuits in a standby state. In addition, if a preamble or a packet addressed to itself is detected by a reception circuit that is in an operative state, the low power consumption mode is canceled, and the PLC communication unit 22 or wireless communication unit 23 is restored to a state in which it is able to perform communication.

In the same way as the control unit 24 shown in FIG. 2, the control unit 44 operates using the internal power supply supplied from the power supply unit 21, and collectively controls the operations of the wireless point access device 40. Namely, the control unit 44 controls the wireless communication unit 23, which performs wireless communication via the wireless communication network N1, and controls the PLC communication unit 22, which performs communication via the PLC line L, and also relays data transmitted and received by the PLC communication unit 22 and data transmitted and received by the wireless communication unit 23. The control unit 44 also performs communication via the PLC line L with the PLC converter 13, and, by correcting the times managed by the time management unit 41, synchronizes the times managed by the time management unit 41 with the times managed by the PLC converter 13 (i.e., the times that are in synchronization with the times of the control unit 14).

In the wireless access point device 40 having the above-described structure, when communication via the PLC line L is not being performed by the PLC communication unit 22, the PLC communication unit 22 is placed in a low power consumption mode by the low power consumption control unit 42, and when wireless communication via the wireless communication network N1 is not being performed by the wireless communication unit 23, the wireless communication unit 23 is placed in a low power consumption mode by the low power consumption control unit 42. Moreover, when previously prescribed control or processing is not being performed by the control unit 44, the control unit 44 is placed in a low power consumption mode by the low power consumption control unit 42. As a consequence, the amount of power consumed by the wireless access point device 40 is reduced, and communication via the PLC line L over an even greater distance becomes possible.

Note that the wireless access point device 40 shown in FIG. 4 includes the control unit 44 instead of the control unit 24 that is provided in the wireless access point device 12 shown in FIG. 2, and the power consumption is reduced by adding the time management unit 41 and the low power consumption control unit 42. However, if the wireless access point device 30 shown in FIG. 3 were constructed in the same way, then the amount of power consumed by the wireless access point device 30 could also be reduced. It is also possible for control to be performed in the wireless access point device 30 shown in FIG. 3 to reduce the power consumed by the wired cable communication unit 32 and the converter 33 in addition to the reduction in the power consumed by the PLC communication unit 22, the wireless communication unit 23, and the control unit 34.

Second Preferred Embodiment

Figure 5:
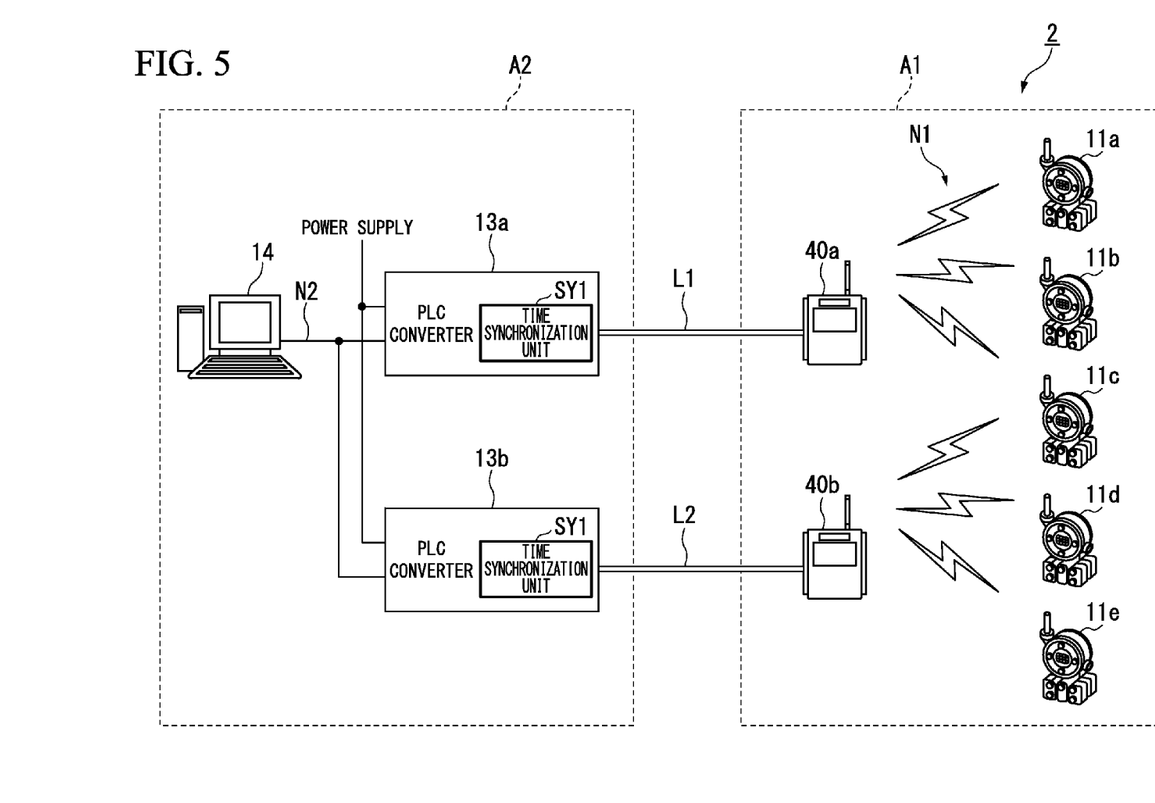
FIG. 5 is a block diagram showing the structure of principal portions of a wireless communication system in accordance with a second preferred embodiment of the present invention.

FIG. 5 is a block diagram showing the structure of principal portions of a wireless communication system in accordance with a second preferred embodiment of the present invention. As is shown in FIG. 5, a wireless communication system 2 has wireless field devices 11a to 11e and wireless access point devices 40a and 40b that are installed at the site A1, PLC converters 13a and 13b that are installed in the control room A2, and the control unit 14. Communication can be achieved via a wireless communication network N1, PLC lines L1 and L2, and a wired communication network N2.

In this wireless communication system 2, in order to improve reliability, a redundant wireless access point device is installed at the site A1, a redundant PLC converter is installed in the control room A2, and a redundant PLC line that connects these together is provided. Note that by providing a redundant wireless access point device, the wireless communication network N1 also becomes redundant. Moreover, in the example shown in FIG. 5, the redundancy is created by providing two of each of the wireless access point devices, the PLC converters, and the PLC lines, however, the redundancy may be created by providing three or more of each of these.

Here, if the wireless communication network N1 is rendered redundant by providing the plurality of wireless access point devices 40a and 40b, then it is necessary for the wireless access point devices 40a and 40b to be synchronized with each other. The time synchronization of the wireless access point devices 40a and 40b is achieved by synchronizing the times managed by the wireless access point devices 40a and 40b respectively with the times (i.e., the times that are in synchronization with the times of the control unit 14) managed by the PLC converters 13a and 13b. The longer the PLC lines L1 and L2, the longer the time required for communication (for example, approximately a hundred μseconds to several milliseconds), and synchronizing the times of the wireless access point devices 40a and 40b becomes difficult. The wireless communication system 2 of the present preferred embodiment makes it possible to accurately synchronize the wireless access point devices 40a and 40b even when the PLC lines L1 and L2 extend for a considerable distance, or when there is a difference between the lengths of the PLC lines L1 and L2.

The wireless field devices 11d and 11e are the same as the wireless field devices 11a through 11c, and perform wireless communication based on the above-described Wireless Communication Standard ISA 100.11a. The wireless access point devices 40a and 40b are the same as the wireless access point device 40 shown in FIG. 4, and have the function of reducing the amount of power consumption by referring to the times managed by the time management unit, and the function of synchronizing the times managed by the time management unit respectively with the times managed by the PLC converters 13a and 13b. The wireless access point device 40a is installed at the site A1 and is connected to the PLC line L1, and operates using power that is supplied via the PLC line L1. The wireless access point device 40b is installed at the site A1 and is connected to the PLC line L2, and operates using power that is supplied via the PLC line L2. Note that this function of synchronizing the times managed by the time management units is described below in more detail.

The PLC converters 13a and 13b are basically the same as the PLC converter 13 described in FIG. 1. The PLC converter 13a is connected to the PLC line L1, and supplies power to the wireless access point device 40a via the PLC line L1. In addition, the PLC converter 13a performs conversions on the signals that are transmitted or received via the PLC line L1, and on signals that are transmitted or received via the wired communication network N2. The PLC converter 13b is connected to the PLC line L2, and supplies power to the wireless access point device 40b via the PLC line L2. In addition, the PLC converter 13b performs conversions on the signals that are transmitted or received via the PLC line L2, and on signals that are transmitted or received via the wired communication network N2.

Moreover, the PLC converters 13a and 13b each include a time synchronization unit SY1 that synchronizes the times they themselves are managing (i.e., times that are in synchronization with the times of the control unit 14) respectively with the times managed by the wireless access point devices 40a and 40b. Note that, although omitted from FIG. 5, in the PLC converters 13a and 13b, an insulating barrier that is the same as the insulating barrier B provided in the PLC converter 13 shown in FIG. 1 is provided in each of the connection interface units (i.e., a connecting units) to which the PLC lines L1 and L2 are connected.

Figure 6:
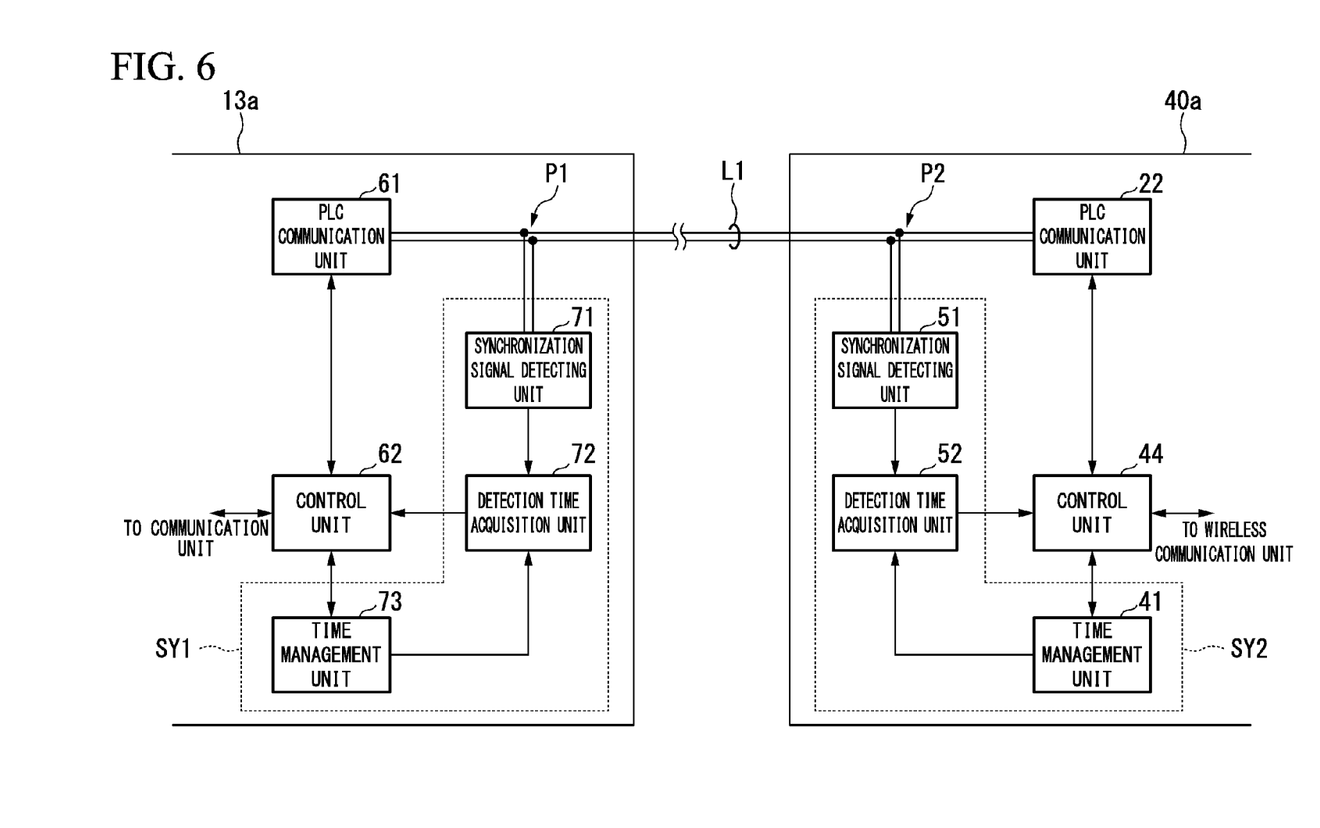
FIG. 6 is a block diagram showing the structures for a time synchronization performed in the wireless communication system in accordance with the second preferred embodiment of the present invention.

FIG. 6 is a block diagram showing the structures for a time synchronization performed in the wireless communication system in accordance with the second preferred embodiment of the present invention. Note that the structures for the time synchronization performed in the wireless communication system 2 shown in FIG. 5 are provided in the PLC converters 13a and 13b and in the wireless access point devices 40a and 40b, however, in order to prevent the drawing from becoming too complex, in FIG. 6 only the structures provided in the PLC converter 13a and the wireless access point device 40a are shown. Moreover, in FIG. 6, blocks that are the same as those shown in FIG. 4 are given the same descriptive symbols.

As is shown in FIG. 6, the PLC converter 13a includes the above-described time synchronization unit SY1, which serves as the structure for performing time synchronization, and the wireless access point device 40a includes a time synchronization unit SY2, which also serves as a structure for performing time synchronization. Note that, in addition to the time synchronization unit SY1, the PLC converter 13a also includes a PLC communication unit 61 that communicates via the PLC line L, and a control unit 62 that collectively controls the operations of the PLC converter 13a including the controlling of the PLC communication unit 61.

The time synchronization unit SY1 that is provided in the PLC converter 13a includes a synchronization signal detecting unit 71, a detection time acquisition unit 72, and a time management unit 73. The synchronization signal detecting unit 71 is connected to the PLC line L1 at a connection point P1, and detects synchronization signals that are transmitted and received via the PLC line L1 between the PLC communication unit 61 and the PLC communication unit 22 that is provided in the wireless access point device 40a. Here, these synchronization signals are in the form of signals having a unique bit string, or in the form of packets or the like in whose header is stored information displaying the fact that the signal is a synchronization signal.

When a trigger signal which shows that a synchronization signal has been detected is output from the synchronization signal detecting unit 71, the detection time acquisition unit 72 acquires the time when that trigger signal was output from the time management unit 73, and outputs this to the control unit 62. The time management unit 73 is the same as the time management unit 41 provided in the wireless access point device 40a, and manages times under the control of the control unit 62.

Note that because the PLC converter 13a exchanges time synchronization information with the control unit 14 using a communication protocol such as, for example, NTP (Network Time Protocol) or the like, the times managed by the time management unit 73 are synchronized with the times in the control unit 14.

The time synchronization unit SY2 that is provided in the wireless access point device 40a has the same structure as the time synchronization unit SY1 provided in the PLC converter 13a, and, in addition to the time management unit 41, it includes a synchronization signal detecting unit 51 and a detection time acquisition unit 52. The synchronization signal detecting unit 51 is connected to the PLC line L1 at a connection point P2, and detects synchronization signals that are transmitted and received via the PLC line L1 between the PLC communication unit 22 and the PLC communication unit 61 provided in the PLC converter 13a. When a trigger signal which shows that a synchronization signal has been detected is output from the synchronization signal detecting unit 51, the detection time acquisition unit 52 acquires the time when that trigger signal was output from the time management unit 41, and outputs this to the control unit 44.

Next, the time synchronization method employed by the wireless communication system 2 having the above-described structure will be described. Note that, in the following description, an example is described in which the times managed by the time management unit 41 of the wireless access point device 40a are synchronized with the times managed by the time management unit 73 of the PLC converter 13a, however, the same method is employed when the times managed by the time management unit 41 of the wireless access point device 40b are synchronized with the times managed by the time management unit 73 of the PLC converter 13b.

Figure 7:
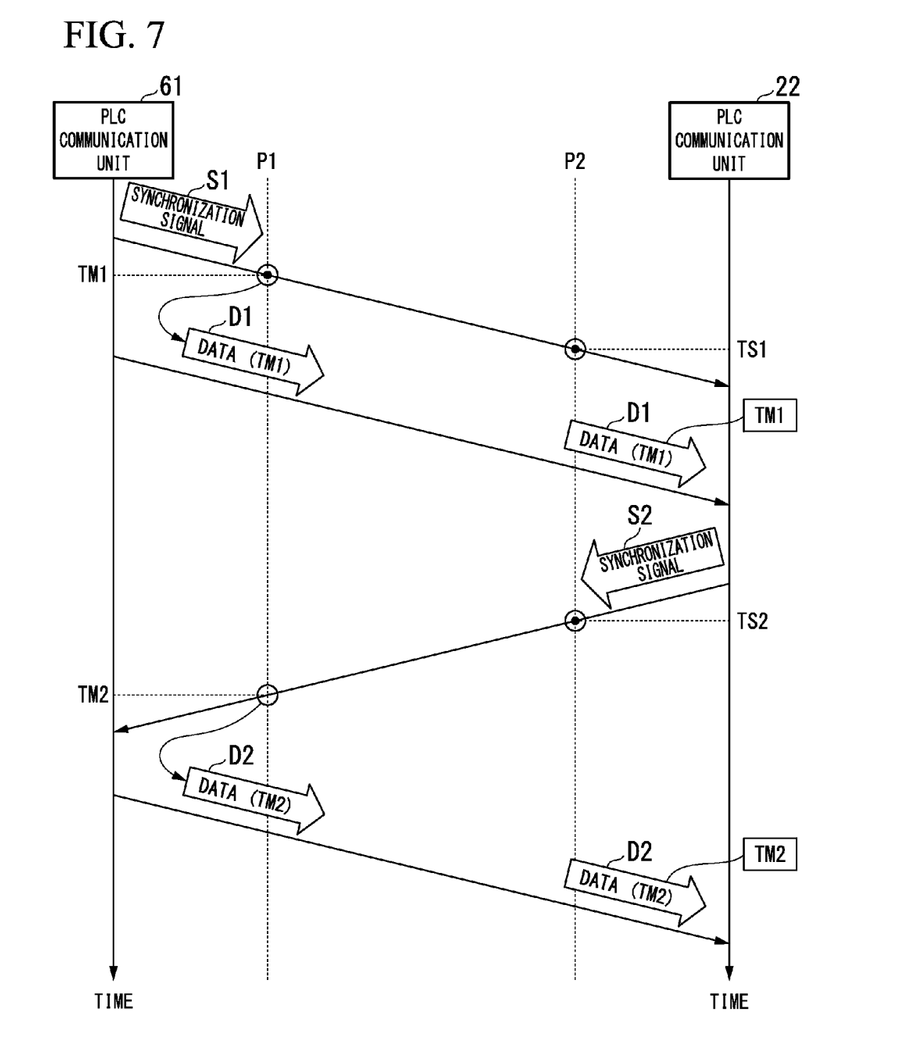
FIG. 7 is a timing chart used to illustrate the time synchronization method employed in the wireless communication system in accordance with the second preferred embodiment of the present invention.

FIG. 7 is a timing chart used to illustrate the time synchronization method employed in the wireless communication system in accordance with the second preferred embodiment of the present invention. Here, times managed by the time management unit 73 of the PLC converter 13a are represented as [TM], while the times managed by the time management unit 41 of the wireless access point device 40a are represented as [TS], and a time differential ΔT exists between these two. Moreover, the time required to perform communication via the PLC line L1 (more accurately, the time required for a signal to travel from the connection point P1 of the PLC line L1 to the connection point P2, or the time required for a signal to travel from the connection point P2 of the PLC line L1 to the connection point P1) is taken as DT.

When the time synchronization processing is started, firstly, in the PLC converter 13a, the control unit 62 controls the PLC communication unit 61 such that processing to deliver the synchronization signal S1 to the PLC line L1 is performed. When the synchronization signal S1 delivered from the PLC communication unit 61 to the PLC line L1 arrives at the connection point P1, it is detected by the synchronization signal detecting unit 71, and a trigger signal is output from the synchronization signal detecting unit 71 to the detection time acquisition unit 72. As a consequence, the detection time acquisition unit 72 acquires from the time management unit 73 the time when the trigger signal was input (i.e., the time TM1) and outputs it to the control unit 62. When the control unit 62 receives this time (i.e., the time TM1) from the detection time acquisition unit 72, it creates time data D1 (i.e., first time data) showing this time, and controls the PLC communication unit 61 such that the time data D1 is delivered to the PLC line L1.

On the other hand, when the synchronization signal S1 that has been delivered from the PLC communication unit 61 of the PLC converter 13a to the PLC line L1 arrives at the connection point P2, it is detected by the synchronization signal detecting unit 51 of the wireless access point device 40a, and a trigger signal is output from the synchronization signal detecting unit 51 to the detection time acquisition unit 52. Consequently, the detection time acquisition unit 52 acquires from the time management unit 41 the time (i.e., the time TS1) when the trigger signal was input, and outputs this to the control unit 44. Moreover, when the time data D1 that was delivered from the PLC communication unit 61 of the PLC converter 13a to the PLC line L1 arrives at the PLC communication unit 22 of the wireless access point device 40a, it is received by the PLC communication unit 22 and output to the control unit 44. As a result of the above-described processing, the time when the synchronization signal S1 that was transmitted from the PLC converter 13a to the PLC line L1 passed through the connection point P1 (i.e., the time TM1), and the time when it passed through the connection point P2 (i.e., the time TS1) are obtained by the control unit 44 of the wireless access point device 40a.

Next, in the wireless access point device 40a, the control unit 44 controls the PLC communication unit 22 such that processing to deliver the synchronization signal S2 to the PLC line L1 is performed. When the synchronization signal S2 delivered from the PLC communication unit 22 to the PLC line L1 arrives at the connection point P2, it is detected by the synchronization signal detecting unit 51, and a trigger signal is output from the synchronization signal detecting unit 51 to the detection time acquisition unit 52. As a consequence of this, the detection time acquisition unit 52 acquires from the time management unit 41 the time (i.e., the time TS2) when the trigger signal was input, and outputs this to the control unit 44.

On the other hand, when the synchronization signal S2 that has been delivered from the PLC communication unit 22 of the wireless access point device 40a to the PLC line L1 arrives at the connection point P1, it is detected by the synchronization signal detecting unit 71 of the PLC converter 13a, and a trigger signal is output from the synchronization signal detecting unit 71 to the detection time acquisition unit 72. Consequently, the detection time acquisition unit 72 acquires from the time management unit 73 the time (i.e., the time TM2) when the trigger signal was input, and outputs this to the control unit 62. When the control unit 62 receives this time (i.e., the time TM2) from the detection time acquisition unit 72, it creates time data D2 (i.e., second time data) showing this time, and controls the PLC communication unit 61 such that the time data D2 is delivered to the PLC line L1.

When the time data D2 delivered from the PLC communication unit 61 of the PLC converter 13a to the PLC line L1 arrives at the PLC communication unit 22 of the wireless access point device 40a, it is received by the PLC communication unit 22 and is then output to the control unit 44. As a result of the above-described processing, the time when the synchronization signal S2 that was transmitted from the wireless access point device 40a to the PLC line L1 passed through the connection point P2 (i.e., the time TS2), and the time when it passed through the connection point P1 (i.e., the time TM2) are obtained by the control unit 44 of the wireless access point device 40a.

Next, the control unit 44 of the wireless access point device 40a uses the times TS1, TM1, TS2, and TM2, which it has obtained by the above-described processing sequence, to determine the time differential ΔT between the times managed by the time management unit 73 of the PLC converter 13a and the times managed by the time management unit 41 of the wireless access point device 40a from the following Formula (1). Note that it is also possible to determine the time DT required for communication performed via the PLC line L1 from the following Formula (2).

$$\Delta T = (A-B)/2 \tag{1}$$

$$DT = (A+B)/2 \tag{2}$$

wherein $A = TS1 - TM1$ $B = TM2 - TS2$

Finally, the control unit 44 of the wireless access point device 40a performs processing to correct the times managed by the time management unit 41 such that the time differential ΔT that was determined using the above-described Formula (1) is zero (third step). As a result of this processing being performed, the times managed by the time management unit 41 of the wireless access point device 40a are synchronized with the times managed by the time management unit 73 of the PLC converter 13a.

As has been described above, the wireless communication system 2 of the present preferred embodiment has a structure in which a wireless access point device, a PLC converter, and a PLC line (and also the wireless communication network N1) are redundant. Because of this, if a malfunction occurs in any one of the redundant wireless access point device, the redundant PLC converter, or the redundant PLC line (for example, in the wireless access point device 40a, the PLC converter 13a, or the PLC line L1), then it is possible to continue communication via the other one (for example, in the wireless access point device 40b, the PLC converter 13b, or the PLC line L2). Because of this, the reliability of the system is improved compared to the wireless communication system 1 shown in FIG. 1.

Moreover, in the wireless communication system 2 of the present preferred embodiment, the synchronization signals S1 and S2 are transmitted and received between the PLC converter 13a (or the PLC converter 13b) and the wireless access point device 40a (or the wireless access point device 40b), and the times when the synchronization signals S1 and S2 pass through the connection points P1 and P2 (i.e., the times TS1, TM1, TS2, and TM2) are obtained. In addition, using these times, the times managed by the time management unit 41 of the wireless access point device 40a (or the wireless access point device 40b) are corrected. Because of this, even if the PLC lines L1 and L2 are long, or if the difference between the lengths of the PLC lines L1 and L2 is considerable, it is still possible to accurately synchronize the wireless access point devices 40a and 40b with the PLC converters 13a and 13b. As a result, even if the wireless communication network N1 is redundant, stable communication can still be performed.

Moreover, in the wireless communication system 2 of the present preferred embodiment, times are corrected using the times when the synchronization signals S1 and S2 pass through the connection points P1 and P2 (i.e., the times TS1, TM1, TS2, and TM2) instead of using the times when the synchronization signals S1 and S2 are transmitted and received by the PLC communication unit 61 of the PLC converters 13a and 13b and the PLC communication unit 22 of the wireless access point devices 40a and 40b. Because of this, even if the PLC communication unit 61 of the PLC converters 13a and 13b and the PLC communication unit 22 of the wireless access point devices 40a and 40b require time for packet processing or modulation processing, time synchronization can still be performed accurately.

Moreover, the time synchronization method employed in the wireless communication system 2 of the present preferred embodiment can also be applied to the wireless communication system 1 shown in FIG. 1 (namely, to a wireless communication system in which there is no redundant wireless access point device, no redundant PLC converter, and no redundant PLC line (and also no redundant wireless communication network N1)). As a result, the wireless access point device 12 can be accurately synchronized with the PLC converter 13 shown in FIG. 1.

The present invention provides a wireless communication system, a wireless communication method, and a wireless access point device that, even if the location where a wireless field device is installed is distant from the location where a control unit is installed, make it possible for communication to be performed between the wireless field device and the control unit without this leading to any sizable increase in costs.

According to the preferred embodiment of the present invention, as a result of a wireless access point device operating using power that is supplied from a conversion device via a two-wire cable, and as a result of signals that are input and output from a control unit and signals that are transmitted and received via the two-wire cable being converted by the conversion device, communication can be performed between wireless field devices and the control unit via a wireless communication network and via the two-wire cable.

According to the preferred embodiment of the present invention, a wireless access point device, which performs wireless communication with wireless field devices via a wireless communication network, and a conversion device, which is connected to a control unit, are connected together via a two-wire cable, and power is supplied from the conversion device to the wireless access point device via the two-wire cable so as to enable to wireless access point device to operate. In addition, signals that are input and output from the control unit and signals that are transmitted and received via the two-wire cable are converted by the conversion device. Because of this, even if the locations where the wireless field devices are installed are distant from the location where the control unit is installed, because it is possible for communication to be performed between the wireless access point device and the conversion unit via the two-wire cable and for power to also be supplied via this two-wire cable, communication can be performed between the wireless field devices and the control unit without this leading to any sizable increase in costs.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wireless communication system in which wireless communication can be performed via a wireless communication network, the wireless communication system comprising:

a wireless access point device configured to operate by using power supplied via a two-wire cable, to perform wireless communication with wireless field devices via the wireless communication network, and to perform communication via the two-wire cable; and a conversion device connected to the two-wire cable and to a control unit configured to control the wireless field devices, the conversion device being configured to supply power to the wireless access point device via the two-wire cable, and to perform conversions between signals, which are input and output from the control unit, and signals, which are transmitted and received via the two-wire cable, wherein:

the conversion device is configured to transmit to the wireless access point device via the two-wire cable first time data that shows the time when a synchronization signal to the wireless access point device was delivered to the two-wire cable, and second time data that shows the time when the synchronization signal from the wireless access point device that was transmitted via the two-wire cable was received; and the wireless access point device is configured to correct times managed by itself by using the time when the synchronization signal from the conversion device that was transmitted via the two-wire cable was received, the time when the synchronization signal to the conversion device was delivered to the two-wire cable, and the times shown by the first time data and second time data.

2. The wireless communication system according to claim 1, wherein the conversion device includes a barrier device configured to output a signal that satisfies an intrinsically safe explosion-proof standard to the two-wire cable.

3. The wireless communication system according to claim 1, wherein a data transfer speed of communication performed via the two-wire cable is set to a higher speed than a data transfer speed of wireless communication that is performed via the wireless communication network.

4. A wireless communication method in which wireless communication is performed via a wireless communication network, the wireless communication method comprising:

supplying power to a two-wire cable so as to enable a wireless access point device to operate, the wireless access point device performing wireless communication with wireless field devices via the wireless communication network, and also performing communication via the two-wire cable;

operating a conversion device for performing conversions between signals, which are input and output from a control unit for controlling the wireless field devices, and signals, which are transmitted and received via the two-wire cable;

transmitting to the wireless access point device via the two-wire cable first time data that shows the time when the conversion device delivers a synchronization signal to be transmitted to the wireless access point device to the two-wire cable, and second time data that shows the time when the conversion device receives the synchronization signal from the wireless access point device that was transmitted via the two-wire cable; and correcting times managed by the wireless access point device by using the time when the wireless access point device receives the synchronization signal that was transmitted via the two-wire cable, the time when the wireless access point device delivers the synchronization signal to the two-wire cable, and the times shown by the first time data and second time data.

5. A wireless access point device that performs wireless communication with wireless field devices via a wireless communication network, the wireless access point device comprising:

a power supply unit configured to generate an internal power supply, which is required to operate, based on the power supplied via a two-wire cable;

a wireless communication unit configured to be supplied with the internal power supply generated by the power supply unit, and to perform wireless communication via the wireless communication network;

a first wired communication unit configured to be supplied with the internal power supply generated by the power supply unit, and to perform communication via the two-wire cable with a conversion device for performing conversions between signals, which are input and output from a control unit for controlling the wireless field devices, and signals, which are transmitted and received via the two-wire cable;

a time management unit configured to manage times; and a control unit configured to control the first wired communication unit so as to transmit a synchronization signal to the conversion device and to receive the synchronization signal from the conversion device via the two-wire cable, the control unit being configured to correct the times managed by the time management unit based on the time when the wireless access point device receives the synchronization signal that was transmitted from the conversion device via the two-wire cable, the time when the wireless access point device delivers the synchronization signal to be transmitted to the conversion device to the two-wire cable, the time when the conversion device delivers the synchronization signal to be transmitted to the wireless access point device to the two-wire cable, and the time when the conversion device receives the synchronization signal from the wireless access point device that was transmitted via the two-wire cable.

6. The wireless access point device according to claim 5, further comprising:

a power control unit configured to be supplied with the internal power supply generated by the power supply unit, and to perform control in order to reduce at least the power consumed by the wireless communication unit and the first wired communication unit.

7. The wireless access point device according to claim 6, wherein the power control unit is configured to perform control to switch the wireless communication unit to a low power consumption mode when the wireless communication unit is not performing wireless communication via the wireless communication network, and to perform control to switch the first wired communication unit to a low power consumption mode when the first wired communication unit is not performing communication via the two-wire cable.

8. The wireless access point device according to claim 6, wherein the power control unit is configured to perform control to switch at least one of the wireless communication unit and the first wired communication unit to a low power consumption mode while referring to the times managed by the time management unit.

9. The wireless access point device according to claim 5, further comprising:

a second wired communication unit configured to perform communication via at least one cable that is different from the two-wire cable, and wherein the wireless access point device is configured to select the first wired communication unit of the first and second wired communication units, and to perform communication via the two-wire cable.

10. The wireless access point device according to claim 5, further comprising:
a second wired communication unit configured to perform communication via at least one cable that is different from the two-wire cable, and wherein
the wireless access point device is configured to select the second wired communication unit of the first wired communication unit and the second wired communication unit, and to perform communication via the cable that is different from the two-wire cable.

* * * * *